Inventors:
Edward Sheridan Stanley
and
David Neil McColl
By Baldwin Wight Willer & Brown
Attorneys

United States Patent Office 3,556,915
Patented Jan. 19, 1971

3,556,915
FLEXIBLE DECORATIVE LAMINATES FOR VERTICAL CLADDING
Edward Sheridan Stanley, Turramurra, New South Wales, and David Neil McColl, Mount Colah, New South Wales, Australia, assignors to Formica International Limited, London, England, a corporation of the United Kingdom
Filed Feb. 23, 1968, Ser. No. 707,795
Int. Cl. B32b 27/10, 27/32, 27/42
U.S. Cl. 161—165
10 Claims

ABSTRACT OF THE DISCLOSURE

A decorative laminate for vertical cladding comprises a core layer constituted by at least one fibrous sheet impregnated with a thermosetting resin such as phenol-formaldehyde, and a decorative surface layer constituted by at least one fibrous sheet impregnated with a thermosetting resin such as melamine-formaldehyde, the decorative surface layer preferably comprising a coloured decorative paper sheet or a printed and/or, decorative paper sheet and an alpha-cellulose paper overlay sheet, there being interposed between the core layer and the decorative surface layer a barrier layer, e.g. a film or an extrusion coating, of a thermoplastic resin forming a cohesive bond with the layers and substantially impermeable to the thermosetting resins.

---

Figure 1:
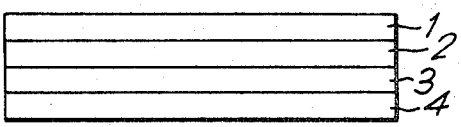

This invention relates to decorative laminates which are of particular use as cladding for vertical surfaces.

Decorative laminates comprising a resin-impregnated core layer and a resin-impregnated decorative surface layer are well-known. The core layer normally comprises one or more fibrous sheets impregnated with a thermosetting resin such as phenol-formaldehyde and the decorative surface layer normally comprises a solidly coloured decorative fibrous sheet, or a solidly coloured, or printed, decorative fibrous sheet surmounted by a sheet of alpha-cellulose (the "overlay"), the sheet or sheets being impregnated with a thermosetting resin such as melamine-formaldehyde. The laminates are made by assembling the resin-impregnated sheets in a stack and then heating and pressing the stack.

Typical resin contents of the fibrous sheets comprising conventional laminates are, for each core sheet 25 to 35% by weight; for a solidly coloured decorative sheet (without overlay) 45 to 55% by weight; for a printed decorative sheet (with overlay) 35 to 45% by weight; and for the overlay 65 to 75% by weight. Thus the minimum practicable amount of thermosetting resin used in the decorative surface layer, with or without an overlay, of a conventional laminate is 44% by weight, and usually amounts in excess of this are employed.

One essential requirement of decorative laminates is that the surface shall be durable, resistant to chemicals, abrasion and scratching and fast to the action of light. By careful selection of resins these desirerata can readily be achieved in the industry but an inevitable property of such laminates, particularly in cases where melamine resins are used, is that the resin-rich decorative surface is somewhat brittle.

Brittleness of the decorative surfaces is not generally a substantial drawback when the number of fibrous core sheets used gives rise to a laminate having a thickness of the order of 1/16″. Such laminates are not intended to be bent, other than by the well known post-forming process which allows deformation without damage to the decorative surface, but thinner laminates are finding ever-increasing uses, especially as cladding materials in vertical applications.

The rigidity of a decorative laminate depends in part upon the thickness of the laminate and in part upon the materials comprising the laminate. A thick laminate is more resistant to bending than a thin laminate formed of the same materials, and where two laminates are equal in all respects but resin content, then that laminate with the lower resin content is the more flexible.

The wearing properties of a decorative laminate will be dependent upon the nature of the surface layer which will be in turn dependent upon, at least in part, the amount of resin in the surface layer.

It will be understood that decorative laminates used for vertical cladding are in general less subject to wear than those used for horizontal cladding and thus they may be made less wear resistant by reducing the amount of expensive resin in the surface layer.

It will also be understood that a decorative laminate as normally utilized is affixed in some manner to a supporting member and thus it is desirable that the properties of the material be such as to facilitate the handling and affixing of the laminate to the supporting member.

Thus it is desirable that the decorative laminate should be of reasonable flexibility enabling it to be bent to relatively small radii and to take up unevenness in the supporting member without cracking. Also the laminate should be cuttable without shattering along the line of cut, resistant to crack propagation and capable of being affixed with normal affixing means such as screwing or nailing without suffering damage.

Also it is known that decorative laminates that contain resins in the surface layer may show such defects as surface crazing or cracking especially when the laminate is used in environments showing changes in temperature and/or humidity, and that the magnitude of these defects increases with the amount of resin used in the surface layer.

From the above considerations it will be seen that if a decorative laminate is produced with a lower resin content in the surface layer than is conventionally used then the laminate thus formed would be cheaper, more flexible and have improved handling and dimensional stability properties but would have lower wear-resistance than a laminate with conventional resin contents. However, it has been found that attempts to produce a decorative laminate with such reduced resin contents magnifies a problem that is basic to laminate production, namely of interchange of resins between layers or "bleedthrough." In conventional laminates this problem is overcome by suitable choice of fibrous sheets, resins, volatile content of the resins and level of resin impregnation. When the resin content is reduced "bleedthrough" is facilitated and results chiefly in penetration of the surface layers by resins from the core layer resulting in discolouration of the decorative surface layer thus marring the appearance of the laminate. It has been found that the lower the resin content of the surface layer, the greater is the extent of penetration of the thermosetting resin from the core layer to the surface layer.

It is a main object of the present invention to provide a decorative laminate suitable for vertical cladding having an unmarred decorative appearance.

The present invention provides a decorative laminate for vertical cladding comprising a core layer constituted by at least one fibrous sheet impregnated with a thermosetting resin and a decorative surface layer constituted by at least one fibrous sheet impregnated with a thermosetting resin characterised in that there is interposed between said core layer and said decorative surface layer a barrier layer of a thermoplastic resin forming a cohesive bond with said surface and core layers and substantially impermeable to thermosetting resins.

Preferably the amount of thermosetting resin in said decorative surface layer is less than 44% by weight.

Laminates in accordance with the present invention are more flexible than conventional laminates of the same thickness by virtue of the facts that they contain less thermosetting resin in the surface layer and that the thermoplasic layer in the laminate is inherently of greater flexibility than a thermosetting layer of the same thickness. In addition the presence of the thermoplastic layer reduces the tendency of crack propagation and improves the mechanical handling properties of the decorative laminate as compared to a conventional laminate of the same thickness.

The thermoplastic barrier layer is conveniently a film of a polymer which has a softening point such that within the temperature range employed during the pressing operation, it will become liquid or flow to a marked extent. Polymers having softening temperatures of below 120° C., e.g. about 100° C., have been found to be satisfactory under typical pressing conditions which involve the use of temperatures between 135° C. and 150° C. and pressures between 900 and 1500 p.s.i.

For example the barrier layer may comprise a film of polyethylene which is preferably subjected to a surface treatment, such as a corona discharge, prior to the production of the laminates in order to improve the cohesive bond formed between the barrier layer and the core and surface layers. An alternative barrier layer comprises a film of polyvinyl chloride, or "Surlyn A" which is a transparent polyethylene ionomer consisting mainly of polyethylene but with polar carboxyl groups introduced thereinto by copolymerisation to obtain ionisable sites, the polymer also containing metal cations.

The thermoplastic barrier layer preferably has a thickness of from 0.0001" to 0.2" and more particularly from 0.0005" to 0.02". It may comprise a separate preformed layer such as a film or it may be coated onto the uppermost surface of the outermost sheet forming part or all of the core layer, or onto the underside surface of the decorative sheet forming all or part of the surface layer before the coated layer is assembled into the stack. Preferably the thermoplastic barrier layer is extrusion coated onto the uppermost surface of the outermost core sheet before the thus coated core sheet is assembled into the stack.

The core layer preferably comprises one or more sheets of paper, particularly kraft paper, impregnated with a thermosetting resin such as a phenol-formaldehyde resole. The decorative surface layer preferably contains 14 to 42% by weight of thermosetting resin and comprises a decorative fibrous sheet which may be, for example, a wood veneer or a textile fabric, but which decorative fibrous sheet is preferably a solidly coloured and/or printed paper sheet such as a high-grade loaded paper sheet. If the decorative fibrous sheet is used with an overlay it is preferred that the decorative fibrous sheet be resin-free at the time the stack of sheets is assembled to form the laminates. Some of the resin in the overlay may migrate to the unimpregnated decorative fibrous sheet during pressing of the assembled sheets, so that in the laminate formed the decorative fibrous sheet will contain some resin. Alternatively a resin-impregnated solidly coloured fibrous sheet may be employed as the decorative surface layer without an overlay, although the present invention does not exclude the use of an overlay with a resin-impregnated decorative fibrous sheet. A preferred overlay for use in the laminates of the present invention is an alpha-cellulose paper sheet impregnated to a resin content of from 60% to 70% by weight of the overlay.

The preferred thermosetting resins (usually termed "noble resins") used in the decorative surface layer include amino-triazine resins such as melamine-formaldehyde resins, melamine, urea-formaldehyde resins, thiourea-formaldehyde resins, unsaturated polyester resins, and amino-triazine-modified alkyd resins. Normally the resin is colourless and transparent, but a coloured resin may be employed if desired.

The fibrous sheets used in the laminates of the present invention may be produced from webs which are subjected to conventional treating processes involving impregnating the webs from solution and drying the webs under controlled conditions, after which sheets of suitable sizes are cut from the web. These sheets are dry enough to be handled but the resins therein are only partially cured and a desired amount of volatile solvent remains in the sheets. Sheets in this condition possess the necessary flow characteristic for good bonding to take place in the pressing operation during which the resins become substantially fully cured.

A preferred laminate in accordance with the present invention has a decorative surface layer comprising (a) an alpha-cellulose paper overlay having an (unimpregnated) weight of from 25 to 45 gm./m.$^2$, preferably 40 to 45 gm./m.$^2$, and containing 60 to 70% by weight of noble resin based on the weight of the impregnated overlay, and (b) a non-impregnated decorative paper sheet having a weight of from 100 to 200 gm./m.$^2$, preferably 130 to 200 gm./m.$^2$. The noble resin content of the decorative surface layer of such a laminate is in the range of from 14 to 42% by weight preferably 20 to 38% by weight.

When no overlay is used a preferred laminate in accordance with the present invention has a decorative surface layer comprising a solidly coloured decorative paper sheet having an unimpregnated weight of from 130 to 200 gm./m.$^2$ impregnated with the noble resin to give a resin content in the impregnated paper sheet of from 27 to 33% by weight.

A further alternative laminate in accordance with the present invention includes a decorative surface layer comprising both an impregnated alpha-cellulose overlay sheet and an impregnated decorative paper sheet, the amount of noble resin in the surface layer being from 25 to 35% by weight.

Laminates in accordance with the present invention preferably have a thickness of from 0.01" to 0.032".

If desired a further barrier layer of a thermoplastic film may be interposed between any one fibrous sheet of the core layer and any underlying fibrous sheet.

In order that the present invention may be clearly understood some preferred embodiments in accordance therewith will now be described by way of example with reference to the accompanying diagrammatic drawings in which FIGS. 1 to 6 are side elevations of flexible decorative laminates in accordance with the present invention.

In the drawings like reference numerals indicate the same or similar parts.

Referring to FIG. 1 there is shown a laminate comprising an overlay 1, a decorative sheet 2, a barrier layer 3 and a core sheet 4. The overlay is, for example, a sheet of alpha-cellulose paper having a weight of from 25 to 45 gm./m.$^2$, preferably 40 to 45 gm./m.$^2$, containing 60 to 70% by weight of a melamine-formaldehyde resin based on the weight of the impregnated paper sheet.

The decorative sheet 2 is preferably non-impregnated prior to formation of the laminate and is, for example, a high-grade loaded paper sheet having a weight of from 100 to 200 gm./m.$^2$, preferably 130 to 200 gm./m.$^2$. The decorative paper sheet may be a solidly coloured and/or printed decorative sheet. The noble resin content of the decorative surface layer formed by sheets 1 and 2 is preferably from 14 to 42% by weight, even more preferably 20 to 38% by weight. Alternatively the decorative paper sheet may also be impregnated with a melamine-formaldehyde resin, and if such an impregnated decorative sheet is used, it is preferred that the amount of resin in the decorative surface layer is from 25 to 35% by weight.

The barrier layer is for example a film of polyethylene the surfaces of which have been treated by a corona discharge, polyvinyl chloride, or "Surlyn A" having a thickness of from 0.0001″ to 0.2″, preferably 0.0005″ to 0.02″. The core sheet 4 is preferably a sheet of kraft paper impregnated with a phenol-formaldehyde resin and containing 25 to 35% by weight of resin. More than one core sheet, particularly two core sheets, may be employed if desired.

The laminate is formed by assembling sheets 1 to 4 in a stack and then pressing the stack between the platens of a hydraulic press under a pressure of from 900 to 1500 p.s.i. and a temperature of from 135° C. to 150° C. The barrier layer 3 is preferably extruded onto the core sheet 4 prior to assembly of the sheets.

Figure 2:
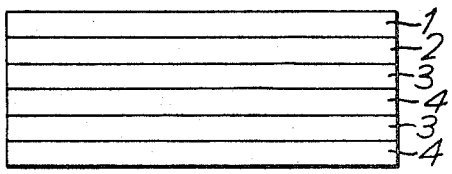
Figure 3:
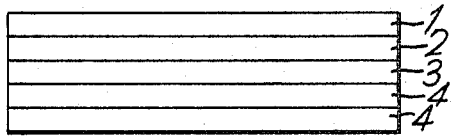

Referring to FIG. 2 there is shown a laminate similar to that of FIG. 1 but including a further barrier layer 3 and a further core sheet 4. FIG. 3 shows a laminate similar to FIG. 1 but including a further core sheet 4.

Figure 4:
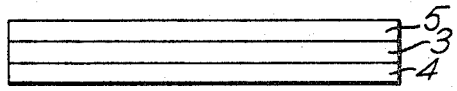
Figure 5:
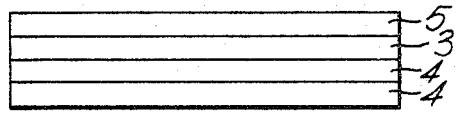
Figure 6:
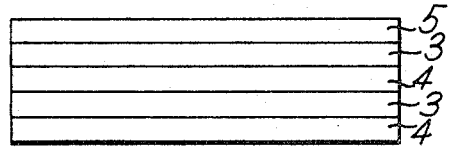

Referring to FIG. 4 there is shown a laminate comprising a decorative sheet 5 constituting the decorative surface layer, a barrier layer 3, and a core sheet 4 constituting the core layer. The decorative sheet 5 is preferably a solidly coloured high-grade loaded paper sheet having an unimpregnated weight of from 130 to 200 gm./m.², impregnated with a melamine-formaldehyde resin to give a resin content in the impregnated sheet of from 27 to 33% by weight. Sheets 3 and 4 are described hereinabove with reference to FIG. 1. FIG. 5 shows a laminate similar to that of FIG. 4 but including a further core sheet 4, and FIG. 6 shows a laminate similar to that of FIG. 4 but including a further barrier layer 3 and a further core sheet 4.

The following examples describe specific laminates in accordance with the present invention. In the examples basis weight of a fibrous sheet means the weight of the unimpregnated fibrous sheet. The resin content of the decorative surface layer is based on the weight of the resin-containing decorative surface layer.

EXAMPLE 1

A stack of fibrous sheets was assembled, the sheets being, from top to bottom:

(a) A 3 mil sheet of alpha cellulose paper of 40 gm./m.² basis weight containing 62% by weight of (uncured) melamine-formaldehyde resin solids and having a volatiles content of 4% by weight.

(b) A sheet of TiO$_2$ loaded paper of basis weight 130 gm./m.² bearing a pattern printed in an ink containing a thermo-setting resinous binder.

(c) A sheet of "Suryln A" 0.002″ thick, and (d) A single standard core sheet of 10 mil. (thou.) kraft paper containing 26% by weight of uncured phenol-formaldehyde resin having a volatiles content of 9%.

The decorative surface layer is constituted by sheets (a) and (b) and contains 28.3% by weight of resin. The barrier layer is constituted by sheet (c) and the core layer by sheet (d).

The stack was placed in a press and subjected to a pressure of 1100 p.s.i. and a temperature of 140° C. for 40 minutes (using fabric finish press plates). The laminate was then removed from the press and was subjected after cooling to a sanding operation on its under-side to a thickness of 0.013″. The flexible laminate was cold punchable and readily cut with scissors without shattering. It was sufficiently flexible to be bendable to small radii without damage to the decorative surface layer.

EXAMPLE 2

A stack was formed as in Example 1 but further including:

(e) A further sheet of "Surlyn A" 0.002″ thick, and
(f) A further standard core sheet.

The stack was treated as in Example 1 except that the time of pressing was 45 minutes.

The flexible laminate obtained was sanded to a thickness of about 0.025″.

EXAMPLES 3 AND 4

Decorative laminates were prepared as in Examples 1 and 2 respectively except that each "Surlyn A" film was repalced by a film of polyethylene of the same thickness which had been treated on both faces by a corona discharge. The laminates obtained were flexible and had an unmarred decorative appearance.

EXAMPLE 5

A stack of fibrous sheets was assembled, the sheets being from top to bottom:

(a) A sheet of plain-coloured decorative paper of basis weight 160 gm./m.² containing 30% by weight of uncured melamine-formaldehyde resin solids.

(b) A sheet of polyethylene 0.002″ thick extrusion coated onto (c) A single-ply kraft paper core sheet having a basis weight of 140 gm./m.² impregnated with 33% by weight of uncured phenol-formaldehyde resin solids.

(d) A further ply of a phenol-formaldehyde impregnated core sheet.

The decorative surface layer was constituted by sheet (a), the barrier layer by sheet (b), and the core layer by sheets (c) and (d).

This stack was placed in a press and pressed under the conditions of Example 1. After removal from the press, cooling, and sanding the under-side, there was obtained a flexible laminate of 0.020″ thickness which was cold-punchable and of good handling properties. It exhibited an unmarred appearance.

EXAMPLE 6

A stack of fibrous sheets was assembled, the first two sheets (a) and (b) being as in Example 1, and then:

(c) A sheet of polyvinyl chloride 0.003″ thick extrusion coated onto (d) A single ply kraft paper core sheet of basis weight 140 gm./m.² impregnated with 33% uncured phenol-formaldehyde resin solids.

(e) A further ply of a phenol-formaldehyde impregnated core sheet.

The stack was pressed under the conditions of Example 1. A flexible laminate was produced that was cold-punchable and of good handling properties, and of unmarred appearance.

The laminates of Examples 1 to 6 were affixed to bases of hardboard, chipboard, plywood, blockboard and wood by means of a urea-formaldehyde adhesive and used as vertical claddings. In all cases a nail could be driven through the decorative surface into the base without causing cracking or shattering of the laminate.

What is claimed is:

1. A relatively thin and flexible decorative laminate for vertical cladding consolidated by heat and pressure comprising a core constituted by at least one paper sheet impregnated with a thermosetting resin, and a decorative surface constituted by at least one paper sheet impregnated with a thermosetting resin to the extent of not more than 44 percent, characterized in that there is interposed between said core and said decorative surface a co-extensive barrier substantially impermeable to the migration of the thermosetting resin in the core, said barrier comprising a thermoplastic film of a resin cohesively and co-extensively bonded to both said core and said decorative surface.

2. A laminate according to claim 1 wherein the amount of thermosetting resin in the decorative surface layer is from 14 to 42% by weight.

3. A laminate according to claim 2 wherein the barrier layer is formed from a thermoplastic resin selected from the class consisting of polyethylene and polyethylene ionomer.

4. A laminate according to claim 3 wherein the barrier layer is extrusion coated onto the core layer.

5. A laminate according to claim 3 having a thickness of from 0.01" to 0.032".

6. A laminate according to claim 1 wherein the thickness of the barrier layer is from 0.0001" to 0.2".

7. A laminate according to claim 1 wherein the thickness of the barrier layer is from 0.0005" to 0.2".

8. A laminate according to claim 1 wherein the decorative surface layer consists of a coloured decorative paper sheet having a weight of from 130 to 200 gm./m.$^2$, the layer being impregnated with from 27 to 33% by weight of thermosetting resin.

9. A laminate according to claim 1 wherein the decorative surface layer consists of a decorative paper sheet having a weight of from 130 to 200 gm./m.$^2$ and which is unimpregnated prior to formation of the laminate, and a resin-impregnated alpha-cellulose paper overlay sheet having a weight of from 40 to 45 gm./m.$^2$ prior to impregnation, the decorative surface layer containing from 20% to 38% by weight of thermosetting resin.

10. A laminate according to claim 9 wherein the resin-impregnated alpha-cellulose paper overlay sheet contains from 60 to 70% by weight of resin.

References Cited

UNITED STATES PATENTS

| | | | |
|---|---|---|---|
| 2,118,549 | 5/1938 | Cochrane | 161—248 |
| 2,991,215 | 7/1961 | Kane | 161—248X |
| 3,234,197 | 2/1966 | Baum | 161—250 |
| 3,294,619 | 12/1966 | Noland | 161—250 |
| 3,338,739 | 8/1967 | Rees | 161—252X |
| 3,345,247 | 10/1967 | Mahar | 161—250X |
| 3,402,086 | 9/1968 | Smith et al. | 161—250X |
| 3,448,000 | 6/1969 | Pacquin et al. | 161—250 |

JOHN T. GOOLKASIAN, Primary Examiner

C. B. COSBY, Assistant Examiner

U.S. Cl. X.R.

161—248, 250, 251, 264